United States Patent
Fuse et al.

(10) Patent No.: US 7,345,778 B2
(45) Date of Patent: Mar. 18, 2008

(54) IMAGE FORMING APPARATUS AND IMAGE FORMING METHOD

(75) Inventors: Hiroyuki Fuse, Tagata-gun (JP); Naoaki Ide, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/822,118

(22) Filed: Jul. 2, 2007

(65) Prior Publication Data

US 2007/0253016 A1  Nov. 1, 2007

Related U.S. Application Data

(63) Continuation of application No. 10/377,784, filed on Mar. 4, 2003, now abandoned.

(51) Int. Cl.
- G06K 9/00 (2006.01)
- G06K 9/20 (2006.01)
- G06K 9/36 (2006.01)
- G06K 9/68 (2006.01)

(52) U.S. Cl. ............ 358/1.14; 358/1.1; 358/1.15; 358/496; 358/497; 358/498; 358/468; 358/474; 399/367

(58) Field of Classification Search ............. 358/496, 358/497, 498, 297, 488, 1.1, 1.15, 1.14, 468, 358/474; 355/407, 408, 48, 50; 399/7, 19, 399/17, 95, 151, 155, 303, 361, 379, 367
See application file for complete search history.

(56) References Cited

U.S. PATENT DOCUMENTS

| | | | |
|---|---|---|---|
| 5,933,520 A | 8/1999 | Ishimoto et al. | |
| 7,212,948 B2 * | 5/2007 | Voser | 702/182 |
| 2002/0006223 A1 * | 1/2002 | Yamagata et al. | 382/199 |
| 2003/0179399 A1 | 9/2003 | Matsunoshita | |

FOREIGN PATENT DOCUMENTS

| | | |
|---|---|---|
| JP | 7-123254 A | 5/1995 |
| JP | 7-264419 A | 10/1995 |
| JP | 2000-324310 A | 11/2000 |

* cited by examiner

*Primary Examiner*—Aung S. Moe
*Assistant Examiner*—Dennis Dicker
(74) *Attorney, Agent, or Firm*—Foley & Lardner LLP

(57) ABSTRACT

If a determination result obtained using software in a scanner CPU is not identical to a determination result obtained using hardware in a determination section, error processing is performed to prevent image forming of a particular document.

10 Claims, 5 Drawing Sheets

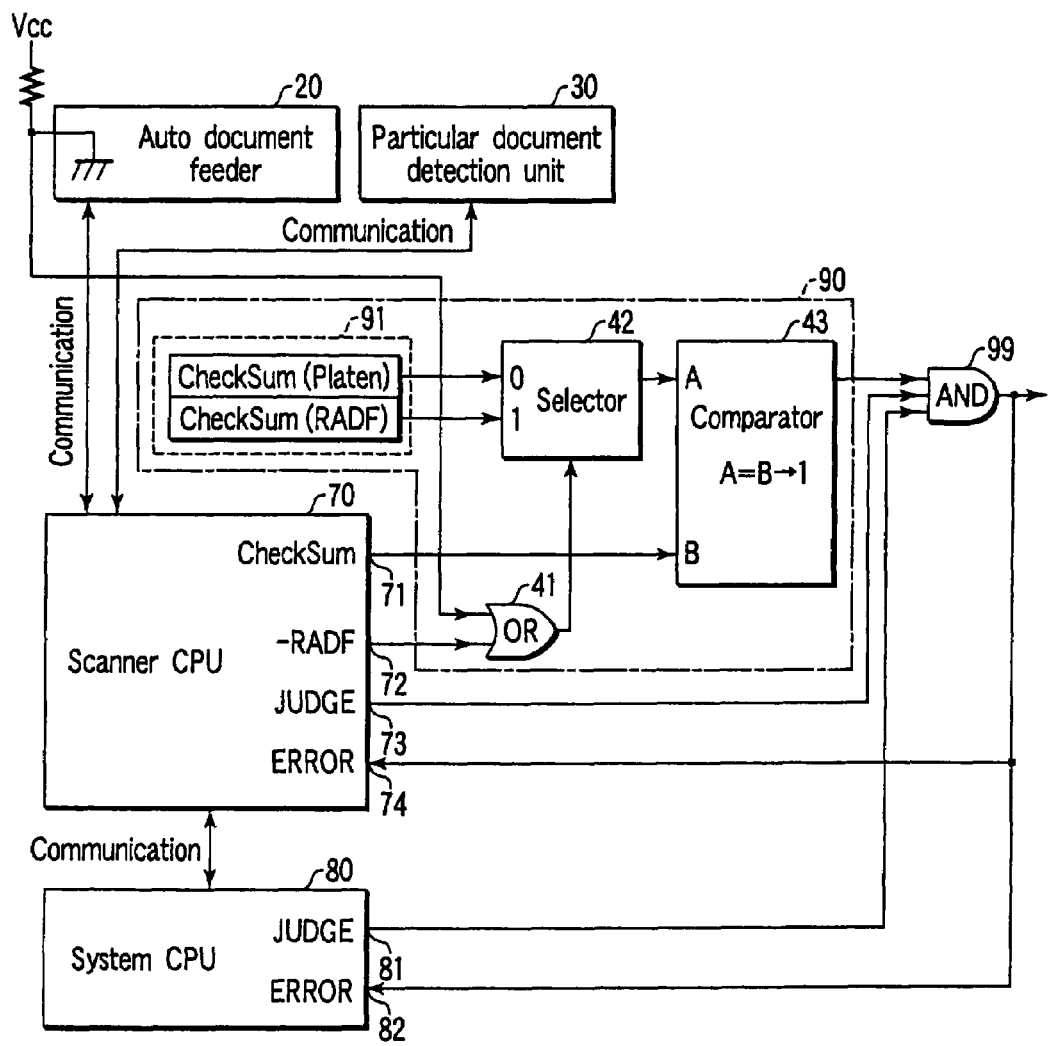
F I G. 5

IMAGE FORMING APPARATUS AND IMAGE FORMING METHOD

CROSS-REFERENCE TO RELATED PATENT APPLICATIONS

This application is a Continuation of U.S. application Ser. No. 10/377,784, filed Mar. 4, 2003, now abandoned incorporated herein by reference in its entirety.

BACKGROUND OF THE INVENTION

The present invention relates to an image forming apparatus and method for forming images of documents, utilizing a function for detecting particular documents.

In accordance with recent enhancement of the performance of color image forming apparatuses such as color copy machines, unauthorized use of these apparatuses has become problematic. For example, color image forming apparatuses have come to be used to counterfeit particular documents, such as bank notes, securities, etc. To overcome this, techniques for detecting particular documents have come to be developed.

Jpn. Pat. Appln. KOKAI Publication No. 7-264419 discloses a technique for prestoring color distribution information concerning particular documents to determine the degree of similarity.

Further, Jpn. Pat. Appln. KOKAI Publication No. 7-123254 discloses an apparatus for determining whether or not the copying of an input document image is prohibited, this apparatus utilizing a repetition pattern dictionary that stores a characteristic amount indicative of a repeated pattern.

For reading a document, image forming apparatuses use a flat-bed system in which a document is read on a platen (document table), or a through-read system in which documents fed by an auto-feed unit are read.

In the flat-bed system, documents are stopped on the platen, and still image reading is performed. On the other hand, in the through-read system, moving documents are read, i.e., moving-image reading is performed.

Between the flat-bed system and through-read system, the start position of document reading is opposite in the horizontal direction. Therefore, the image read by the flat-bed system is a normal copy image, while the image read by the through-read system is a mirror copy image.

If an image forming apparatus employs both systems, it must have two types of dictionary for normal copy and mirror copy images, similar to the above-mentioned particular-document detecting dictionary, in order to detect particular documents.

Therefore, in the prior art, when the images read using the platen (still document reading) and document auto-feeder (moving document reading) are normal copy and mirror copy images, respectively, either a normal copy image dictionary or a mirror copy image dictionary is loaded to a particular document detection unit for detecting particular documents, according to circumstances.

Alternatively, in the prior art, hardware is provided, in which only one dictionary is used, and a normal copy or mirror copy image is always input to a particular-document detecting apparatus, regardless of whether a platen is used (still image reading) or a document auto-feeder is used (moving image reading).

In the image forming apparatus using two types of dictionary for normal copy and mirror copy images, if a normal copy image dictionary has been wrongly loaded, instead of a mirror copy image dictionary, into a particular document detection unit, a checksum corresponding to the dictionary (dictionary data) loaded in the particular document detection unit is referred to for determining whether the dictionary loaded is an appropriate one.

However, if software for performing such a determination has malfunctioned and a wrong dictionary has been loaded, particular documents may not be detected and hence their images may be formed (counterfeited).

Further, in the case of employing the hardware for enabling normal copy or mirror copy image data to be always input to the particular document detection unit, a line memory of a capacity corresponding to at least six lines is required, thereby increasing the cost, the six lines being the sum of one main-scanning directional line and one line as a buffer for each of colors R, G and B.

BRIEF SUMMARY OF THE INVENTION

It is an object of the present invention to provide an image forming apparatus and method capable of preventing the formation of an image of a particular document regardless of whether the image is a normal copy image or mirror copy image.

To attain the object, there is provided an image forming apparatus having a particular document detection unit used to detect whether or not a document to be read by a reading unit is a particular one, comprising: a first control section configured to load the particular document detection unit with a normal copy image dictionary or a mirror copy image dictionary for detecting the particular document in accordance with a set document read mode, the set document read mode being a first document read mode in which the document is read by the reading unit while the document is moved, or a second document read mode in which the document is read by the reading unit while the document is placed on a document table; a first determination section configured to determine, when the normal copy image dictionary or the mirror copy image dictionary is loaded into the particular document detection unit, whether or not the normal copy image dictionary or the mirror copy image dictionary loaded in the particular document detection unit is an appropriate dictionary, using prestored software, check information concerning the loaded dictionary read from the particular document detection unit, and information concerning the document read mode; a second determination section formed of hardware and configured to determine whether or not the particular document detection unit is loaded with the appropriate dictionary, on the basis of the check information concerning the loaded dictionary and the information concerning the document read mode transmitted from the reading unit; and a second control section configured to determine whether or not the normal copy image dictionary or the mirror copy image dictionary loaded in the particular document detection unit is the appropriate dictionary, on the basis of the determination result of the first determination section and the determination result of the second determination section.

There is also provided an image forming method for use in an image forming apparatus having a particular document detection unit used to detect whether or not a document to be read by a reading unit is a particular one, comprising: loading the particular document detection unit with a normal copy image dictionary or a mirror copy image dictionary for detecting the particular document in accordance with a set document read mode, the set document read mode being a first document read mode in which the document is read by the reading unit while the document is moved, or a second document read mode in which the document is read by the reading unit while the document is placed on a document table; determining, when the normal copy image dictionary or the mirror copy image dictionary is loaded into the particular document detection unit, whether or not the normal copy image dictionary or the mirror copy image dictionary loaded in the particular document detection unit is an appropriate dictionary, using prestored software; further determining whether or not the particular document detection unit is loaded with the appropriate dictionary, using hardware; and performing dictionary reloading or error processing if it is determined from results of the two determinations that the normal copy image dictionary or the mirror copy image dictionary loaded in the particular document detection unit is not the appropriate dictionary.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram illustrating a schematic structure of a particular document detection system incorporated in a scanner section according to a third embodiment of the invention.

DETAILED DESCRIPTION OF THE INVENTION

Embodiments of the invention will be described with reference to the drawings.

Figure 1:
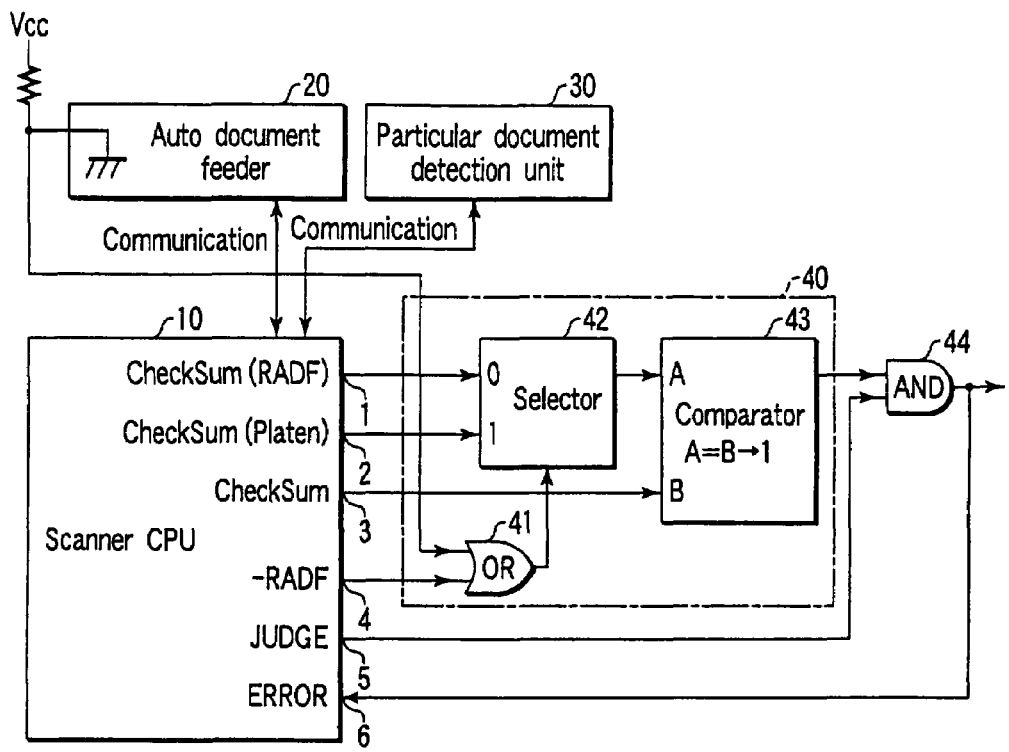
FIG. 1 is a block diagram illustrating a schematic structure of a particular document detection system incorporated in the scanner section of an image forming apparatus according to a first embodiment of the invention.

FIG. 1 shows a schematic structure of a particular document detection system incorporated in the scanner section of an image forming apparatus according to a first embodiment of the invention.

The detection system comprises a scanner CPU 10 for controlling the entire scanner section, an auto document feeder (hereinafter referred to as an "RADF") 20 for feeding a document for through-read reading (moving document reading), a particular document detection unit 30 for detecting a particular document, and a determination section 40 for determining whether or not an appropriate dictionary is loaded in the particular document detection unit 30. The scanner CPU 10 is connected to the RADF 20 and document detection unit 30 to communicate with them.

The scanner CPU 10 pre-holds a normal copy image dictionary and mirror copy image dictionary, and loads the normal copy image dictionary or mirror copy image dictionary onto the particular document detection unit 30 in accordance with the image reading system. Specifically, in the case of reading a document fed by the RADF 20, i.e., in the case of through-read reading, the scanner CPU 10 loads the mirror copy image dictionary. In the case of reading a document fed from a platen (not shown), i.e., in the case of flat-bet reading, the CPU loads the normal copy image dictionary.

The scanner CPU 10 comprises a mirror copy image dictionary checksum output port 1, a normal copy image dictionary checksum output port 2, a checksum port 3 for outputting a checksum (dictionary check information) read from the particular document detection unit 30, a -RADF output port 4 for outputting "0" when a document is set on the RADF 20, a JUDGE output port 5 for outputting the result of a checksum determination performed by software (in the case of conformity, "1" is output), and an ERROR input port 6.

The scanner CPU 10 monitors the signal input to the ERROR input port 6, reloads the dictionary when the signal is abnormal, and performs error processing if the signal is kept abnormal even after reloading.

The particular document detection unit 30 is loaded with the normal copy or mirror copy dictionary by the scanner CPU 10, thereby detecting whether a document read using the dictionary is a particular document.

The determination section 40 comprises an OR circuit (OR) 41, selector 42, comparator 43 and AND circuit (AND) 44.

The OR circuit 41 has one end for inputting an RADF connection signal from the RADF 20, and the other end for inputting a signal from the -RADF output port 4, and outputs a logical sum signal to the selector 42.

The selector 42 receives, during its initialization, a signal from the mirror copy image dictionary checksum port 1 and a signal from the normal copy image dictionary checksum port 2, thereby outputting one of the signals in accordance with a signal from the OR circuit 41.

A signal from the selector 42 and a signal from the checksum output port 3 are input to the comparator 43, where they are compared, the result being output to the AND circuit 44.

The AND circuit 44 receives, from the comparator 43, a signal indicative of its comparison result, also receives a signal from the JUDGE output port 5, and outputs a signal indicative of the logical multiplication of the signals. This signal is output to the ERROR input port 7 in the form of "1" when it is normal, and in the form of "0" when it is abnormal. Further, this signal is used later as an enable signal for a CCD, exposure lamp, document feed motor, scanning motor, etc., which are incorporated in the image forming apparatus but not shown.

Figure 2:
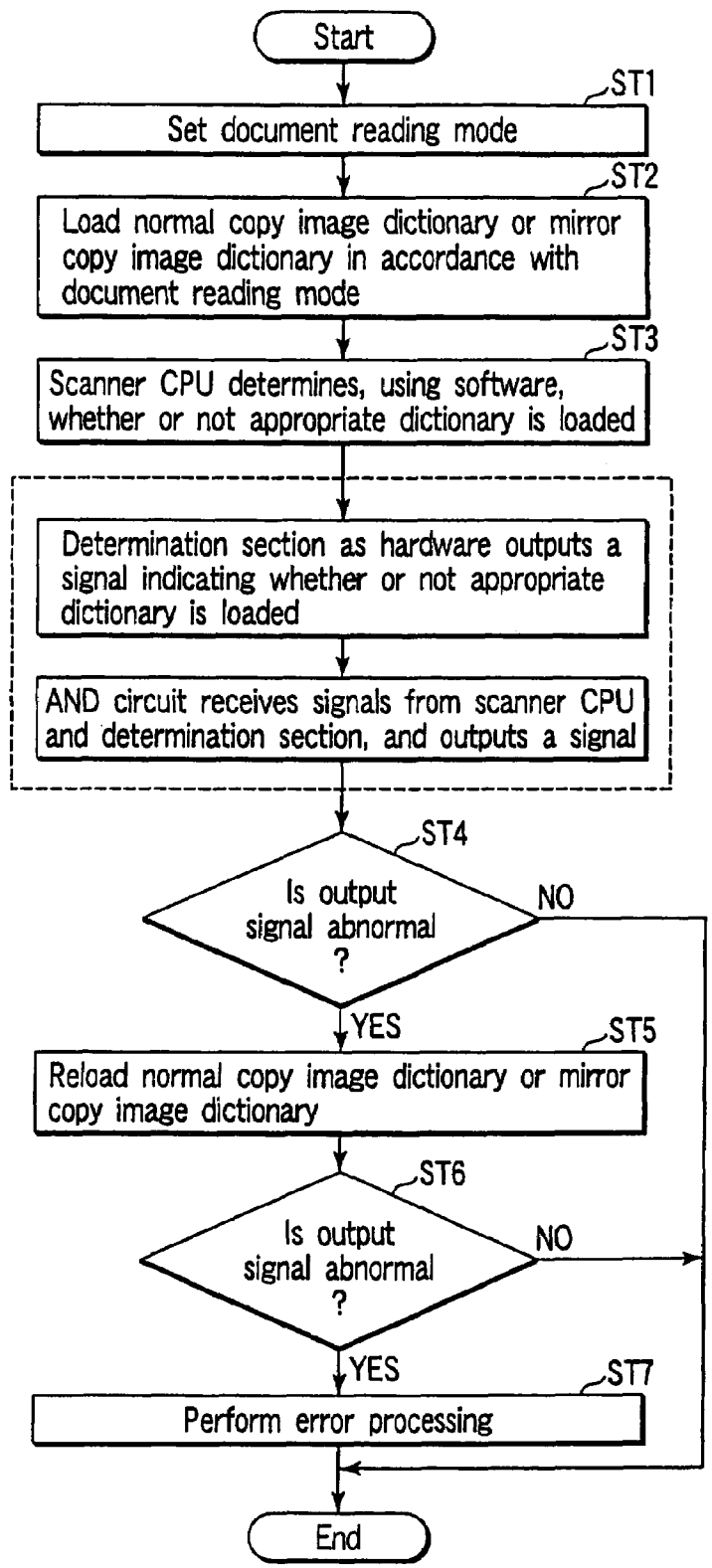
FIG. 2 is a flowchart useful in explaining the operation of the particular document detection system according to the first embodiment.

Referring now to the flowchart of FIG. 2, the operation of the particular document detection system constructed as the above, according to the first embodiment, will be described.

Firstly, in the image forming apparatus, it is determined whether the document reading mode is through-read reading using the RADF 20 or reading using the platen (ST1).

In accordance with the determined document reading mode, the scanner CPU 10 loads the normal copy image or mirror copy image dictionary onto the particular document detection unit 30 (ST2).

Subsequently, in accordance with the document reading mode determined at the step ST1, the scanner CPU 10 performs comparison concerning the checksum read from the particular document detection unit 30, using software, thereby determining whether or not an appropriate dictionary (normal copy image or mirror copy image dictionary) is loaded in the particular document detection unit 30. The determination result ("1" indicates conformity) is output from the JUDGE output port 5 to the AND circuit 44 (ST3).

On the other hand, the determination section 40 performs the following operation.

The OR circuit 41 receives an RADF connection signal (if this signal is "0", it indicates establishment of a connection) from the RADF 20, and a signal (if this signal is "0", it indicates that a document is set on the RADF 20) from the -RADF output port 5 of the scanner CPU 10, and outputs, to the selector 42, a signal indicative of the logical sum of the signals.

During initialization of the selector 42, a signal ("0") from the mirror copy image dictionary checksum output port 1, and a signal ("1") from the normal copy image dictionary checksum output port 2 are set in the selector 42, and the selector outputs "0" or "1" to the comparator 43 in accordance with a signal from the OR circuit 41.

The comparator 43 compares the signal from the selector 42 with the checksum read by the scanner CPU 10 from the particular document detection unit 30. If they are identical, "1" is output to the AND circuit 44, whereas if they are not identical, "0" is output to the AND circuit 44.

The AND circuit 44 receives the signal (determination result) from the scanner CPU 10, and the signal from the determination section 40, and outputs a signal indicative of the logical sum of the signals.

The scanner CPU 10 determines the signal output from the AND circuit 44 (ST4). If the output signal is "0", indicating an abnormality, it is determined that correct loading has not been performed, thereby reloading the normal copy or mirror copy image dictionary onto the particular document detection unit 30 (ST5).

If the output signal stays abnormal even after the normal copy or mirror copy image dictionary is reloaded at the step ST5 (ST6), the scanner CPU 10 performs error processing (ST7).

As described above, in the first embodiment, if the determination result of the scanner CPU 10 using software is not identical to the determination result of the determination section 40 using hardware, error processing is performed, whereby image forming of a particular document is avoided.

A second embodiment will now be described.

Figure 3:
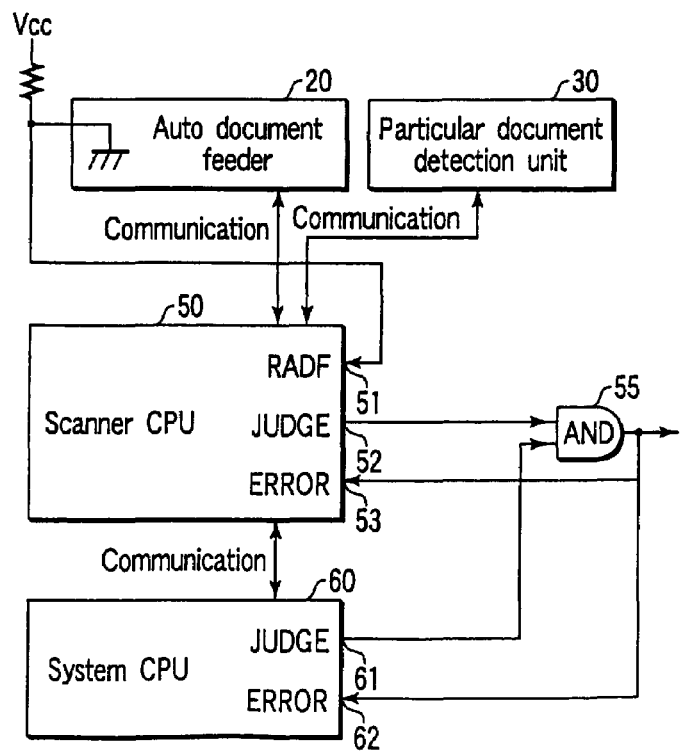
FIG. 3 is a block diagram illustrating a schematic structure of a particular document detection system incorporated in a scanner section according to a second embodiment of the invention.

FIG. 3 shows a schematic structure of a particular document detection system incorporated in a scanner section according to the second embodiment.

This detection system comprises a scanner CPU 50 for controlling the entire scanner section, a system CPU 60 for controlling the entire image forming apparatus, an auto document feeder (hereinafter referred to as an "RADF") 20 for feeding a document for through-read reading (moving document reading), a particular document detection unit 30 for detecting a particular document, and an AND circuit 55 for outputting normal and abnormal signals that respectively indicate whether or not an appropriate dictionary is loaded in the particular document detection unit 30.

The scanner CPU 50 holds, as initial values, respective checksums corresponding to a normal copy image dictionary and mirror copy image dictionary. Further, the scanner CPU 50 has an RADF input port 51 for inputting a connection signal that assumes "0" when a document is set on the RADF 20, a JUDGE output port 52 for outputting the result of a checksum determination performed by software (in the case of conformity, "1" is output), and an ERROR input port 53.

Further, the scanner CPU 50 supplies the system CPU 60 with a checksum read from the particular document detection unit 30, a connection signal from the RADF 20, and information indicating whether or not a document is placed on the RADF 20.

The system CPU 60 holds, as initial values, respective checksums corresponding to the normal copy image dictionary and mirror copy image dictionary. Further, the system CPU 60 has a JUDGE output port 61 for outputting the result of a checksum determination performed by software (in the case of conformity, "1" is output), and an ERROR input port 62.

Figure 4:
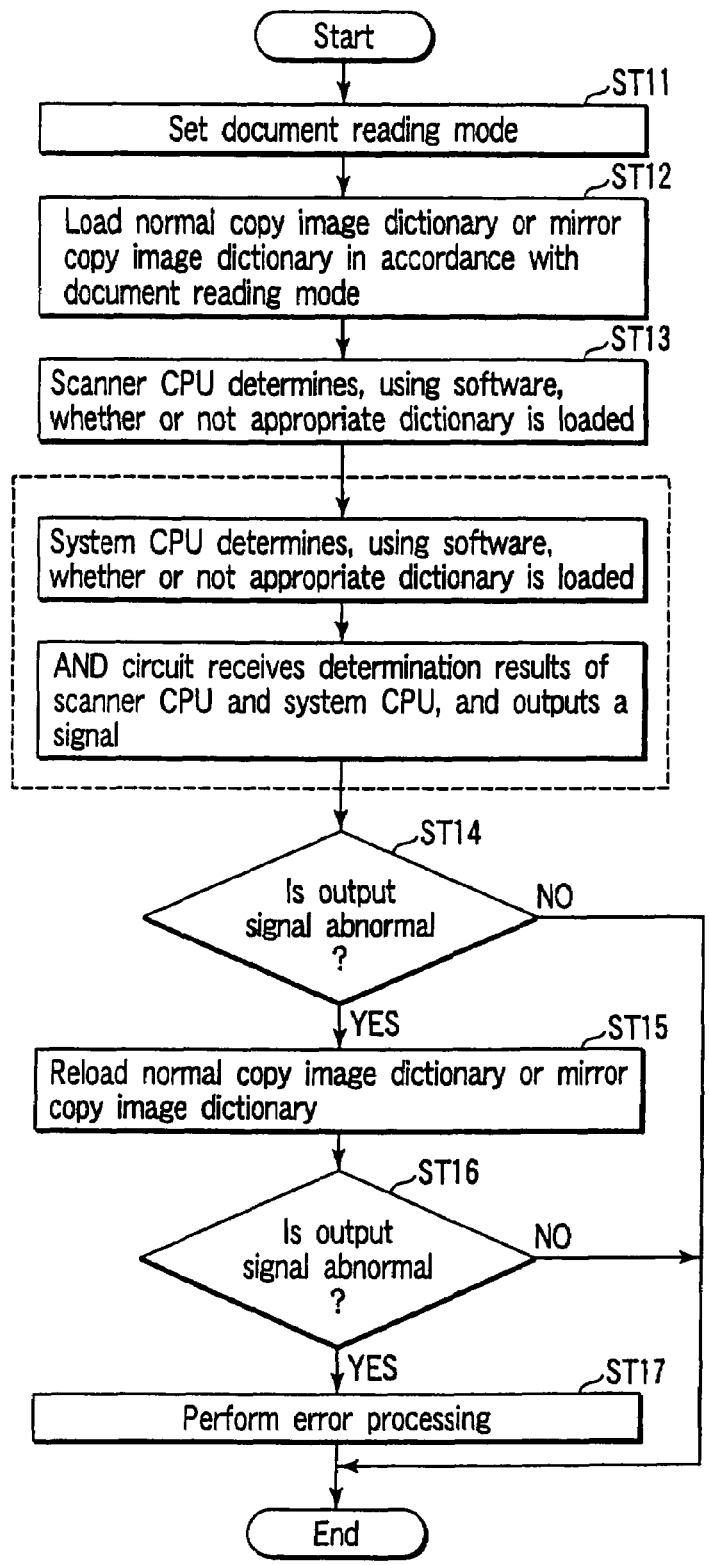
FIG. 4 is a flowchart useful in explaining the operation of the particular document detection system according to the second embodiment.

Referring to the flowchart of FIG. 4, the operation of the particular document detection system of the second embodiment will be described.

Firstly, in the image forming apparatus, it is determined whether the document reading mode is through-read reading using the RADF 20 or reading using the platen (ST11).

In accordance with the determined document reading mode, the scanner CPU 50 loads the normal copy image or mirror copy image dictionary onto the particular document detection unit 30 (ST12).

Subsequently, in accordance with the document reading mode determined at the step ST11, the scanner CPU 50 performs comparison concerning the checksum read from the particular document detection unit 30, using software, thereby determining whether or not an appropriate dictionary (normal copy image or mirror copy image dictionary) is loaded in the particular document detection unit 30. The determination result ("1" indicates conformity) is output from the JUDGE output port 52 to the AND circuit 55 (ST13).

Further, in accordance with the document reading mode determined at the step ST11, the system CPU 60 performs comparison concerning the checksum read by the scanner CPU 50 from the particular document detection unit 30, using software, thereby determining whether or not an appropriate dictionary (normal copy image or mirror copy image dictionary) is loaded in the particular document detection unit 30. The system CPU 60 outputs the determination result ("1" indicates conformity) to the AND circuit 55 via the JUDGE output port 52.

The AND circuit 55 receives the signal (determination result) from the scanner CPU 50 and the signal (determination result) from the system CPU 60, and outputs a signal indicative of the logical multiplication of the signals.

The scanner CPU 50 determines the signal output from the AND circuit 55 (ST14). If the output signal is "0" indicating an abnormality, it is determined that correct loading has not been performed, thereby reloading the normal copy or mirror copy image dictionary onto the particular document detection unit 30 (ST15).

If the output signal keeps abnormal even after the normal copy or mirror copy image dictionary is reloaded at the step ST15 (ST16), the scanner CPU 50 performs error processing (ST17).

The system CPU 60 may perform error processing.

As described above, in the second embodiment, if the determination result of the scanner CPU 50 using software is not identical to the determination result of the system CPU 60 using hardware, error processing is performed, whereby image forming of a particular document is avoided.

A third embodiment will be described.

FIG. 5 shows a schematic structure of a particular document detection system incorporated in a scanner section according to the third embodiment.

This detection system comprises a scanner CPU 70 for controlling the entire scanner section, a system CPU 80 for controlling the entire image forming apparatus, an auto document feeder (hereinafter referred to as an "RADF") 20 for feeding a document for through-read reading (moving document reading), a particular document detection unit 30 for detecting a particular document, a determination section 90 for determining whether or not an appropriate dictionary is loaded in the particular document detection unit 30, and an AND circuit 99.

The scanner CPU 70 holds, as initial values, respective checksums corresponding to a normal copy image dictionary and mirror copy image dictionary. Further, the scanner CPU 70 has a checksum port 71 for outputting a checksum read from the particular document detection unit 30, a -RADF output port 72 for outputting "0" when a document is set on the RADF 20, a JUDGE output port 73 for outputting the result of a checksum determination performed by software (in the case of conformity, "1" is output), and an ERROR input port 74.

Further, the scanner CPU 70 supplies the system CPU 80 with a checksum read from the particular document detection unit 30, a connection signal from the RADF 20, and information indicating whether or not a document is placed on the RADF 20.

The system CPU 80 holds, as initial values, respective checksums corresponding to the normal copy image dictionary and mirror copy image dictionary. Further, the system CPU 80 has a JUDGE output port 81 for outputting the result of a checksum determination performed by software (in the case of conformity, "1" is output), and an ERROR input port 82.

The determination section 90 comprises a setting section 91 for outputting checksums corresponding to the normal copy image dictionary and mirror copy image dictionary, OR circuit (OR) 41, selector 42 and comparator 43.

Figure 6:
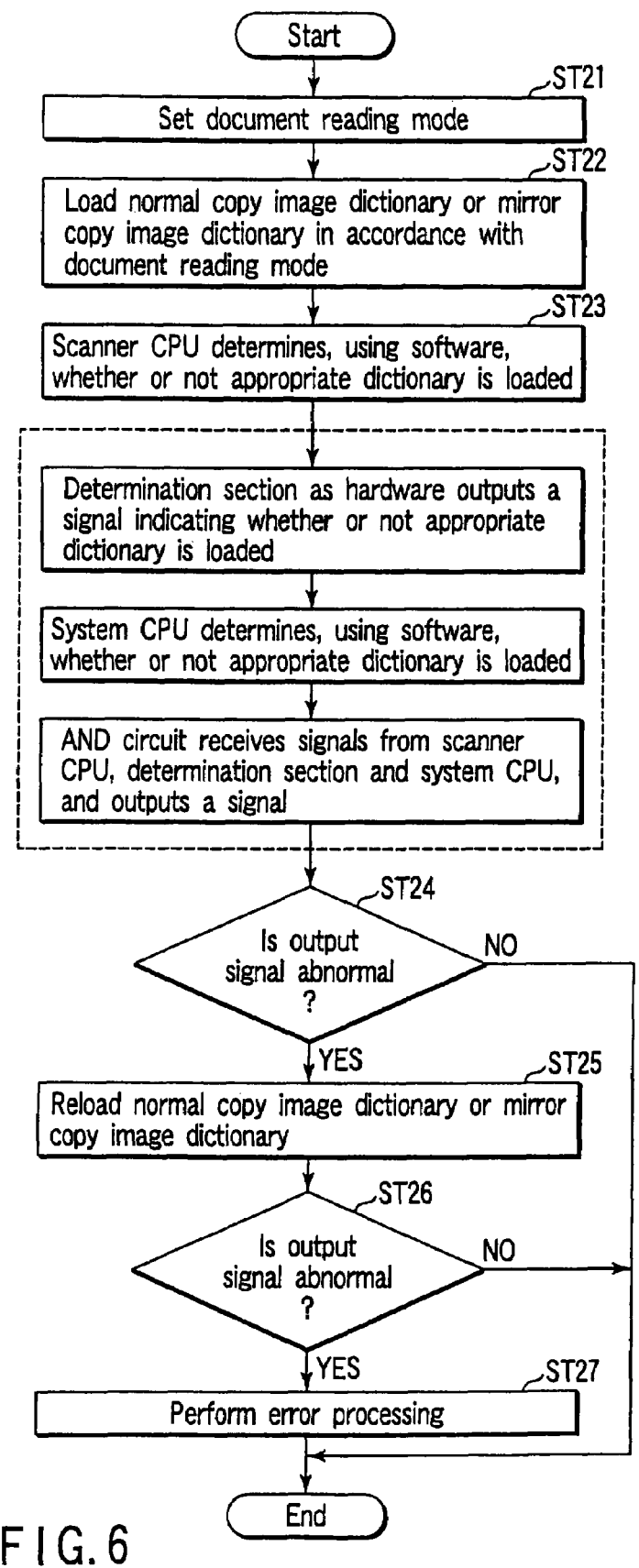
FIG. 6 is a flowchart useful in explaining the operation of the particular document detection system according to the third embodiment.

Referring to the flowchart of FIG. 6, a description will be given of the operation of the particular document detection system of the third embodiment constructed as the above.

Firstly, in the image forming apparatus, it is determined whether the document reading mode is through-read reading using the RADF 20 or reading using the platen (ST21).

In accordance with the determined document reading mode, the scanner CPU 70 loads the normal copy image or mirror copy image dictionary onto the particular document detection unit 30 (ST22).

Subsequently, in accordance with the document reading mode determined at the step ST21, the scanner CPU 70 performs comparison concerning the checksum read from the particular document detection unit 30, using software, thereby determining whether or not an appropriate dictionary (normal copy image or mirror copy image dictionary) is loaded in the particular document detection unit 30. The determination result ("1" indicates conformity) is output from the JUDGE output port 73 to the AND circuit 99 (ST23).

On the other hand, the determination section 90 performs the following operation.

During initialization, the setting section 91 sets, in the selector 42, checksums corresponding to the mirror copy image dictionary and normal copy image dictionary. The OR circuit 41, selector 42 and comparator 43 operate in the same manner as in the first embodiment, therefore no description will be given thereof. The comparator 43 outputs a signal indicative of a comparison result to the AND circuit 99.

The system CPU 80 performs comparison concerning the checksum read by the scanner CPU 50 from the particular document detection unit 30, using software, thereby determining whether or not an appropriate dictionary (normal copy image or mirror copy image dictionary) is loaded in the particular document detection unit 30. The system CPU 80 outputs the determination result ("1" indicates conformity) to the AND circuit 99 via the JUDGE output port 82.

The AND circuit 99 receives the signal (determination result) from the scanner CPU 70 and the signal (determination result) from the system CPU 80, and outputs a signal indicative of the logical multiplication of the signals.

The scanner CPU 70 determines the signal output from the AND circuit 99 (ST24). If the output signal is "0" indicating an abnormality, it is determined that correct loading has not been performed, thereby reloading the normal copy or mirror copy image dictionary onto the particular document detection unit 30 (ST25).

If the output signal keeps abnormal even after the normal copy or mirror copy image dictionary is reloaded at the step ST25 (ST26), the scanner CPU 70 performs error processing (ST27).

The system CPU 80 may perform error processing.

As described above, in the third embodiment, if the determination result of the scanner CPU 70 using software is not identical to the determination result of the determination section 90 using hardware, error processing is performed, whereby image forming of a particular document is avoided.

Further, in the first to third embodiments, as error processing, the CCD element of a reading unit or an exposure lamp, etc. may be disabled to prevent further image forming, or a particular pattern may be formed on a paper sheet which is subjected to image forming.

Furthermore, error processing is performed if an abnormality is not disappeared even after reloading is executed. However, error processing may be performed when an abnormality occurs for the first time, or after reloading is executed several times.

In addition, for error processing, the output signal of the AND circuit 44 (55, 99) may be directly used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus having a particular document detection unit used to detect whether or not a document to be read by a reading unit is a particular one, comprising:
a first control section configured to load the particular document detection unit with a normal read image dictionary or a mirror read image dictionary to detect the particular document in accordance with a set document read mode, the set document read mode being a first document read mode, or a second document read mode different from the first document read mode;

a first determination section configured to determine, when the normal read image dictionary or the mirror read image dictionary is loaded into the particular document detection unit, whether or not the normal read image dictionary or the mirror read image dictionary loaded in the particular document detection unit is an appropriate dictionary, using prestored software, check information concerning the loaded dictionary read from the particular document detection unit, and information concerning the document read mode;

a second determination section configured to determine whether or not the particular document detection unit is loaded with the appropriate dictionary, using prestored software, the check information concerning the loaded dictionary and the information concerning the document read mode transmitted from the reading unit; and a second control section configured to determine whether or not the normal read image dictionary or the mirror read image dictionary loaded in the particular document detection unit is the appropriate dictionary, on the basis of the determination result of the first determination section and the determination result of the second determination section.

2. The apparatus according to claim 1, wherein the first document read mode (document) is read by the reading unit while the document is moved, the second document read mode (document) is read by the reading unit while the document is placed on a document table.

3. The apparatus according to claim 2, wherein the second control section performs dictionary reloading or error processing if the normal read image dictionary or the mirror read image dictionary loaded in the particular document detection unit is not the appropriate dictionary.

4. An image reading apparatus having a particular document detection unit used to detect whether or not a document to be read by a reading unit is a particular one, comprising:

a first control section configured to load the particular document detection unit with a normal read image dictionary or a mirror read image dictionary to detect the particular document in accordance with a set document read mode, the set document read mode being a first document read mode, or a second document read mode different from the first document read mode;

a first determination section configured to determine, when the normal read image dictionary or the mirror read image dictionary is loaded into the particular document detection unit, whether or not the normal read image dictionary or the mirror read image dictionary loaded in the particular document detection unit is an appropriate dictionary, using prestored software, check information concerning the loaded dictionary read from the particular document detection unit, and information concerning the document read mode;

a second determination section formed of hardware and configured to determine whether or not the particular document detection unit is loaded with the appropriate dictionary, on the basis of the check information concerning the loaded dictionary and the information concerning the document read mode transmitted from the reading unit; and a third determination section configured to determine whether or not the particular document detection unit is loaded with the appropriate dictionary, using prestored software, the check information concerning the loaded dictionary and the information concerning the document read mode; and a second control section configured to determine whether or not the normal read image dictionary or the mirror read image dictionary loaded in the particular document detection unit is the appropriate dictionary, on the basis of the determination result of the first determination section and the determination result of the second determination section.

5. The apparatus according to claim 4, wherein the first document read mode (document) is read by the reading unit while the document is moved, the second document read mode (document) is read by the reading unit while the document is placed on a document table.

6. The apparatus according to claim 5, wherein the second control section performs dictionary reloading or error processing if the normal read image dictionary or the mirror read image dictionary loaded in the particular document detection unit is not the appropriate dictionary.

7. An image forming apparatus having a particular document detection unit used to detect whether or not a document to be read by a reading unit is a particular one, comprising:

a first control section configured to load the particular document detection unit with a normal copy image dictionary or a mirror copy image dictionary to detect the particular document in accordance with a set document read mode, the set document read mode being a first document read mode in which the document is read by the reading unit while the document is moved, or a second document read mode in which the document is read by the reading unit while the document is placed on a document table;

a first determination section configured to determine, when the normal copy image dictionary or the mirror copy image dictionary is loaded into the particular document detection unit, whether or not the normal copy image dictionary or the mirror copy image dictionary loaded in the particular document detection unit is an appropriate dictionary, using prestored software, check information concerning the loaded dictionary read from the particular document detection unit, and information concerning the document read mode;

a second determination section configured to determine whether or riot the particular document detection unit is loaded with the appropriate dictionary, using prestored software, the check information concerning the loaded dictionary and the information concerning the document read mode transmitted from the reading unit; and a second control section configured to determine whether or not the normal copy image dictionary or the mirror copy image dictionary loaded in the particular document detection unit is the appropriate dictionary, on the basis of the determination result of the first determination section and the determination result of the second determination section.

8. The image forming apparatus according to claim 7, wherein the second control section performs dictionary reloading or error processing if the normal copy image dictionary or the mirror copy image dictionary loaded in the particular document detection unit is not the appropriate dictionary.

9. An image forming apparatus having a particular document detection unit used to detect whether or not a document to be read by a reading unit is a particular one, comprising:

a first control section configured to load the particular document detection unit with a normal copy image dictionary or a mirror copy image dictionary to detect the particular document in accordance with a set document read mode, the set document read mode being a first document read mode in which the document is read by the reading unit while the document is moved, or a second document read mode in which the document is read by the reading unit while the document is placed on a document table;

a first determination section configured to determine, when the normal copy image dictionary or the mirror copy image dictionary is loaded into the particular document detection unit, whether or not the normal copy image dictionary or the mirror copy image dictionary loaded in the particular document detection unit is an appropriate dictionary, using prestored software, check information concerning the loaded dictionary read from the particular document detection unit, and information concerning the document read mode;

a second determination section formed of hardware and configured to determine whether or not the particular document detection unit is loaded with the appropriate dictionary, on the basis of the check information concerning the loaded dictionary and the information concerning the document read mode transmitted from the reading unit;

a third determination section configured to determine whether or not the particular document detection unit is loaded with the appropriate dictionary, using prestored software, the check information concerning the loaded dictionary and the information concerning the document read mode; and a second control section configured to determine whether or not the normal copy image dictionary or the mirror copy image dictionary loaded in the particular document detection unit is the appropriate dictionary, on the basis of the determination result of the first determination section and the determination result of the second determination section.

10. The image forming apparatus according to claim 9, wherein the second control section performs dictionary reloading or error processing if the normal copy image dictionary or the mirror copy image dictionary loaded in the particular document detection unit is not the appropriate dictionary.

* * * * *